United States Patent
Kao et al.

(10) Patent No.: US 10,601,800 B2
(45) Date of Patent: Mar. 24, 2020

(54) SYSTEMS AND METHODS FOR USER AUTHENTICATION USING PATTERN-BASED RISK ASSESSMENT AND ADJUSTMENT

(71) Applicant: FMR LLC, Boston, MA (US)

(72) Inventors: Jason Kao, Cary, NC (US); Erkang Zheng, Cary, NC (US)

(73) Assignee: FMR LLC, Boston, MA (US)

( * ) Notice: Subject to any disclaimer, the term of this patent is extended or adjusted under 35 U.S.C. 154(b) by 221 days.

(21) Appl. No.: 15/441,647

(22) Filed: Feb. 24, 2017

(65) Prior Publication Data
US 2018/0248863 A1    Aug. 30, 2018

(51) Int. Cl.
*H04L 29/06* (2006.01)
*H04W 12/06* (2009.01)
*H04W 12/00* (2009.01)

(52) U.S. Cl.
CPC ............ *H04L 63/08* (2013.01); *H04L 63/102* (2013.01); *H04L 63/107* (2013.01); *H04W 12/06* (2013.01); *H04W 12/00502* (2019.01); *H04W 12/00503* (2019.01); *H04W 12/00505* (2019.01); *H04W 12/00508* (2019.01)

(58) Field of Classification Search
CPC ...................................................... H04L 63/08
USPC ............................................................ 726/4
See application file for complete search history.

(56) References Cited

U.S. PATENT DOCUMENTS

| | | | |
|---|---|---|---|
| 8,904,496 B1 | 12/2014 | Bailey et al. | |
| 9,154,516 B1 | 10/2015 | Vaystikh et al. | |
| 9,509,688 B1 * | 11/2016 | Magi Shaashua | H04L 63/0861 |
| 9,574,888 B1 * | 2/2017 | Hu | G01C 21/3461 |
| 2005/0097320 A1 | 5/2005 | Golan et al. | |
| 2008/0222706 A1 | 9/2008 | Renaud et al. | |
| 2009/0158425 A1 * | 6/2009 | Chan | G06F 21/60 726/21 |
| 2016/0142443 A1 | 5/2016 | Ting et al. | |
| 2016/0292694 A1 * | 10/2016 | Goldschlag | H04L 63/20 |
| 2017/0109509 A1 * | 4/2017 | Baghdasaryan | G06Q 20/40 |
| 2018/0007049 A1 * | 1/2018 | Palki | H04L 63/0861 |

* cited by examiner

*Primary Examiner* — Jacob Lipman
(74) *Attorney, Agent, or Firm* — Proskauer Rose LLP

(57) ABSTRACT

A computer-implemented method is provided for authenticating an identity of a user requesting access to a computerized resource via a client computing device. The method includes receiving, by the client computing device, a request to authenticate the identity of the user, determining, by the client computing device, a time period of the request, determining, by the client computing device, an approximate geolocation of the user, and determining, by the client computing device, one or more network characteristics associated with a current network of the client computing device. The method further includes transmitting, by the client computing device to an authentication device, authentication data including the request, the time period of the request, the approximate geolocation of the user and the one or network characteristics.

18 Claims, 4 Drawing Sheets

SYSTEMS AND METHODS FOR USER AUTHENTICATION USING PATTERN-BASED RISK ASSESSMENT AND ADJUSTMENT

TECHNICAL FIELD

This application relates generally to systems, methods and apparatuses, including computer program products, for authenticating the identity of a user who is requesting access to a computerized resource by assessing one or more potential risks related to the authentication.

BACKGROUND

In today's computing environment, user authentication can often be adjusted based on the amount of perceived risks involved. For example, one or more factors can be added to an authentication process depending on how risky a login attempt may be. In some instances, a second authentication factor or another step is added to a one-step authentication process if, for example, a cookie of the computing device from which the user attempts to authenticate is missing, which prevents the authentication system from confirming prior use of the computing device. The additional authentication factor(s) can require the user to retrieve an identification code by text, call or email and enter the retrieved identification code at a designated authentication site. However, existing authentication systems and methods lack a comprehensive and holistic approach for evaluating authentication risks and adjusting authentication complexity.

SUMMARY

Accordingly, there is a need for improved systems, methods and apparatuses for automated risk assessment in the context of user authentication. The present invention provides an approach for creating and maintaining usage profiles that comprehensively capture the unique computing behavior and patterns of individual users and using these profiles to evaluate the risks related to user authentication.

In one aspect, a computer-implemented method is provided for authenticating an identity of a user requesting access to a computerized resource via a client computing device. The method comprises receiving, by the client computing device, a request to authenticate the identity of the user, determining, by the client computing device, a time period of the request, and determining, by the client computing device, an approximate geolocation of the user by analyzing a current listing of one or more adjacent networks within a geographical range of a current location of the client computing device. The method also includes determining, by the client computing device, one or more network characteristics associated with a current network of the client computing device. The one or more characteristics include (i) identities of one or more additional computing devices connected to the current network, (ii) a traffic pattern of the current network, and (iii) a connectivity profile of the current network. The method further includes transmitting, by the client computing device to an authentication device, authentication data including the request, the time period of the request, the approximate geolocation of the user and the one or network characteristics. The authentication device is configured to authenticate the identity of the user based on the authentication data.

In some embodiments, the connectivity profile of the current network describes at least one type of device connectivity within the current network. In some embodiments, the one or more additional computing devices of the current network comprises at least one of a thermostat, a portable computing device, a desktop computer, a security camera, or a lighting system connected to the same current network as the client computing device.

In some embodiments, determining a traffic pattern comprises determining an average time interval at which one or more devices connected to the current network transmit data on the current network.

In some embodiments, the authentication device is configured to authenticate the identity of the user by retrieving a usage profile corresponding to the identity of the user, where the usage profile comprises historical data of at least one successful user authentication at a past point in time. The historical data includes (i) a time period of the successful user authentication, (ii) a historical listing of one or more adjacent networks within a geographical range of a location from which the user authenticated at the past point in time, (iii) identities of one or more devices connected to a historical network from which the user authenticated at the past point in time, and (iv) a traffic pattern of the historical network. In addition, the authentication device is configured to authenticate the identity of the user by generating a risk score comprising a weighted sum of numerical differences between at least a portion of the historical data in the usage profile and the current data received from the client computing device, and determining a type of authentication protocol based on the risk score. The authentication protocol has an increased level of complexity if the risk score is greater than a predetermined threshold.

In some embodiments, retrieving the usage profile comprises retrieving a portion of the historical data in the usage profile corresponding to at least one time period of successful user authentication that matches the time period of the request. In some embodiments, the usage profile comprises data of multiple successful authentications at multiple past points in time corresponding to the identity of the user.

In some embodiments, the numerical differences include (i) a value representing an extent of match between the historical listing and the current listing of adjacent networks, (ii) a value representing an extent of match between the identities of devices connected to the historical network and the current network, and (iii) a value representing an extent of match between the traffic patterns of the historical network and the current network. The value representing the extent of match between the historical listing and the current listing of adjacent networks can measure a likelihood of the user connecting from a familiar geolocation. The values representing the extents of match between the device identities and traffic patterns associated with the historical network and the current network can measure a likelihood of the user connecting from a familiar network.

In some embodiments, generating the risk score comprises determining, by the authentication device, a filtered portion of the historical data in the usage profile having at least one time period of successful user authentication that matches the time period of the request, and calculating, by the authentication device, the risk score based on a weighted sum of values representing differences between the filtered portion of the historical data and the current data.

In another aspect, a computer-implemented method is provided for authenticating an identity of a user requesting access to a computerized resource via a client computing device. The method comprises receiving, by an authentication device, a request from the client computing device to authenticate the identity of the user, and retrieving, by the authentication device, a usage profile corresponding to the identity of the user, where the usage profile comprises historical data of at least one successful user authentication at a past point in time. The historical data includes (i) a historical network listing of one or more adjacent networks within a range of a location from which the user authenticated at the past point in time, (ii) identities of one or more devices connected to a historical network from which the user authenticated at the past point in time, and (iii) a traffic pattern of the historical network. The method also includes receiving, by the authentication device, current data associated with the request. The current data includes at least (i) a current network listing of one or more adjacent networks within a range of a current location of the client computing device, (ii) identities of one or more additional computing devices connected to a current network of the client computing device, and (iii) a traffic pattern of the current network. The method additionally includes generating, by the authentication device, a risk score associated with authenticating the identity of the user, where the risk score comprising a weighted sum of numerical differences between at least a portion of the historical data in the usage profile and the current data. The differences include (i) a value representing an extent of match between the historical network listing and the current network listing, (ii) a value representing an extent of match between the identities of devices connected to the historical network and the current network, and (iii) a value representing an extent of match between the traffic patterns of the historical network and the current network. The method further includes determining, by the authentication device, a type of authentication protocol based on the risk score by increasing a complexity of the authentication protocol if the risk score is greater than a predetermined threshold.

In some embodiments, the method further comprises updating, by the authentication device, the usage profile with the current data after successful user authentication. The method can further comprise asking, by the authentication device, the user's permission to update the usage profile prior to the updating. In some embodiments, the method further comprises storing, by the authentication device, at least one of the current data or the usage profile corresponding to the identity of the user.

In some embodiments, the method further comprises determining, by the authentication device, a filtered portion of the historical data in the usage profile having at least one time period of successful user authentication that matches a time period of the request, and calculating, by the authentication device, the risk score based on a weighted sum of values representing differences between the filtered portion of the historical data and the current data.

In some embodiments, increasing the complexity of the authentication protocol comprises adding another factor to the authentication protocol if the risk score is above the predetermined threshold.

In yet another aspect, a computer program product, tangibly embodied in a non-transitory computer readable storage device, is provided for authenticating an identity of a user requesting accessing to a computerized resource via a client computing device. The computer program product including instructions operable to cause the client computing device to receive a request to authenticate the identity of the user, determine a time period of the request, determine an approximate geolocation of the user by analyzing a current listing of one or more adjacent networks within a geographical range of a current location of the client computing device, and determine one or more network characteristics associated with a current network of the client computing device. The one or more characteristics include (i) identities of one or more additional computing devices connected to the current network, (ii) a traffic pattern of the current network, and (iii) a connectivity profile of the current network. The computer program product also includes instructions operable to cause the client computing device to transmit to an authentication device the request, authentication data including the time period of the request, the approximate geolocation of the user and the one or more network characteristics. The authentication device is configured to authenticate the identity of the user based on the authentication data.

In some embodiments, the one or more additional computing devices of the current network comprises at least one of a thermostat, a portable computing device, a desktop computer, a security camera, or a lighting system connected to the same current network as the client computing device.

In some embodiments, the instructions operable to cause the client computing device to determine a traffic pattern comprises instructions operable to cause the client computing device to determining an average time interval at which the one or more additional computing devices transmit data on the current network.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

The present invention features systems and methods for automatically adjusting the complexity of user authentication based on a comprehensive assessment of risks associated with the authentication. For example, one or more extra steps (e.g., additional factors or tests) can be automatically added to the authentication process if an authentication attempt is determined to be risky. In contrast, for legitimate attempts with lower associated risks, a simpler authentication method, such as a one-factor authentication method, is provided. The present invention also features systems and methods for generating and updating user profiles based on which risks associated with user authentication can be accurately determined.

Figure 1:
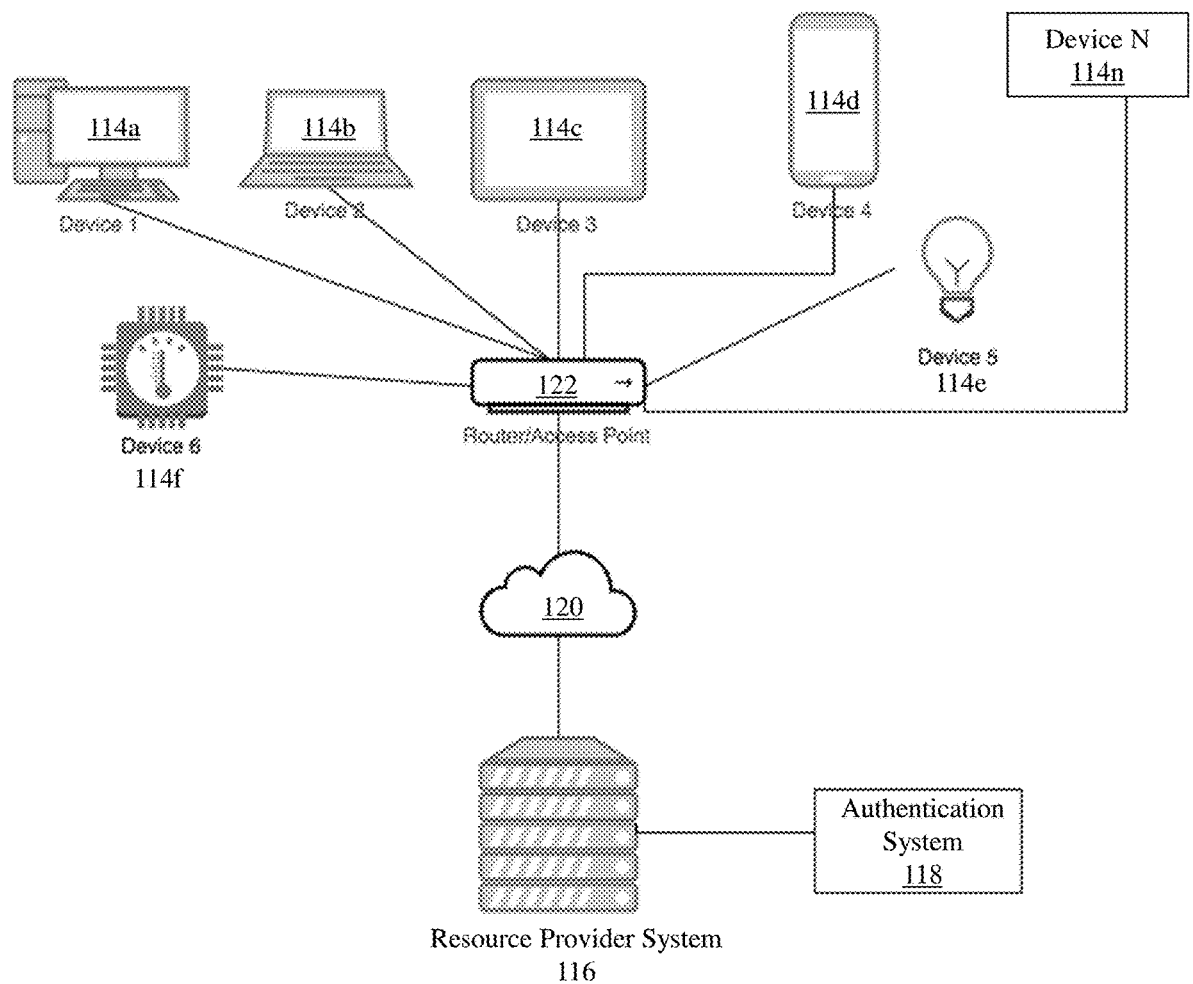
FIG. 1 is a block diagram of a network environment, according to an illustrative embodiment of the invention.

FIG. 1 is a block diagram of a network environment, according to an illustrative embodiment of the invention. The network environment includes one or more user computing devices (hereinafter referred to as user devices) 114, a resource provider system 116 and an authentication system 118. A user, via at least one of the user devices 114, can make a request to the resource provider system 116 to access a computerized resource. In some embodiments, the user device 114 communicates the request to the resource provider system 116 via a networking device 122 that is in electrical communication with the resource provider system 116 over an IP network 120. The user devices 114 and the networking device 122 can be interconnected within a local communication network 124. The resource provider system 116, prior to allowing the user access to the requested resource, can forward the request, along with other pertinent information, to an authentication system 118 to authenticate the user associated with the user device 114.

Each of the user devices 114 can be a computing device with a processor and memory that can execute instructions. In addition, each user device 114 can be a device with internet connectivity that may send or receive data from the internet. The user devices 114 can be interconnected within the local network 124 by the networking device 122, which can be a router that is configured to forward data packets between the local network 124 and the IP network 120. Thus, the networking device 122 connects the various user devices 114 in the local communication network 124 and enables their access to the IP network 120. In various embodiments, the local communication network 124 can be a local area network (LAN), a wide area network ("WAN") or a network comprising components of both a LAN and a WAN.

Within the local network 124, at least one of the user devices 114 is a device from which a user can send a resource-accessing request to the service provider system 116 (hereinafter referred to as a "requesting user device"). The requesting user device 114 can be, but not limited to, a personal computer, a server computer, a portable computer, a laptop computer, a personal digital assistant (PDAs), an e-Reader, a cellular telephone, an e-mail client, a tablet or another mobile device. In some embodiments, the requesting user device 114 has Global Position System (GPS) capability or other location-determining capability. For example, the requesting use device 114 can transmit cellular signals that enable triangulation to its approximate physical location. One or more of the remaining user devices 114 are connected to the same local network 124 as the requesting user device 114. For example, if the local network 124 is a residential home network, the remaining user devices 114 can include a thermostat, a smartphone, a tablet, a computer, a security camera, a lighting system, etc. In some embodiments, one or more of the remaining user device 114 are directly connected to the requesting user device 114.

The resource provider system 116, upon receiving an access request from the requesting user device 114, is configured to interact with the authentication system 118 to first authenticate the user prior to allowing the user access to the requested resource. For example, the resource provider system 116 can interact with the authentication system 118 over the IP network 120 (or a different communication network) to authenticate the user. The IP network 120 thus provides connections among the local communication network 124, the resource provider system 116 and the authentication system 118. In various embodiments, the IP network 120 can comprise a local network, such as a LAN or WAN, the Internet and/or a cellular network, or any other type of network known in the art. In some embodiments, the authentication system 118 is integrated with the resource provider system 116. In some embodiments, the authentication system 118 is managed by a third party external to the resource provider system 116.

Generally, the requesting user device 114 can transmit pertinent data to the resource provider system 116 for authentication purposes. The data can be used by the authentication system 118 to authenticate the user. For example, the requesting user device 114 can transmit information related to the request, which includes at least one of a user identifier, a passcode and/or an identification of the resource(s) requested. The requesting user device 114 can also determine the approximate time period the request is made and forward the time period of the request to the authentication system 118. In some embodiments, the time period of request is a fuzzy time period recorded as "early morning," "morning," "around noon," "early evening," "evening," "late night," etc. In some embodiments, a combination of two fuzzy time periods is used if the time of request is on the border of the two time periods. In some embodiments, the time period of request can also indicate the day of the week the request is being made.

In some embodiments, the user device 114 determines an approximate geolocation of the user and forwards related geolocation data to the authentication system 118. The user device 114 can first determine the user's physical location (e.g., map coordinates) based on signals emitted by the user device, such as cellular triangulation and GPS signals and/or publicly broadcasted Wi-Fi access points service set identifier (SSID) and media access control (MAC) data from neighboring Wi-Fi networks. The requesting user device 114 can also use a fuzzy logic approach to determine a fuzzy location, where the absolute physical coordinates of the user device is not determined, but the spatial or planar relation between the user device and another entity is. For example, the fuzzy location can be determined by a) the user device 114 being connected to a public network, such as a Wi-Fi network at a coffee shop, b) using the geolocation mechanism described above to pinpoint the device location to a coffee shop, and/or c) the distance the user device 114 is away from a reference location (e.g., home) of no more than a predetermined distance (e.g. 10 miles). Based on such physical location, either exact or fuzzy, the requesting user device 114 can then determine one or more adjacent or surrounding networks within a predetermine distance from the location, to which the requesting user device 114 may or may not be directly connected. For example, the requesting user device 114 can obtain a list of Wi-Fi access points that are within a certain distance from its physical location. The requesting user device 114 can forward the list of adjacent networks, along with its physical coordinates or fuzzy location, to the service provider system 116.

In some embodiments, the requesting user device 114 determines one or more characteristics associated with the current local network 124 to which it is connected and forwards the network characteristics to the authentication system 118. The characteristics can include the identity (and other identification information) of one or more additional user devices 114 connected to the same network 124. For example, if the network 124 is a residential home network, the additional user devices 114 connected to the network 124 can be one or more home electronic devices, which can include, but not limited to, routers, thermostats, lighting systems, computers, security cameras, televisions, refrigerators, and/or mobile devices, etc. An identifier associated with at least one of these network-connected devices can be forwarded to the authentication system 118. In some cases, the additional user devices 114 can comprise one or more devices directly connected to the requesting user device 114 itself. For example, a user may attempt to login from his iPhone, which may be connected to a fitness wearable and an Apple watch. An identifier associated with at least one of these directly connected devices can be forwarded to the authentication system 118.

Characteristics of the current network 124 can include traffic information, such as a traffic pattern, of the current network 124. In some embodiments, the requesting user device 114 uses a network analysis tool to capture traffic data associated with the network 124 for a specific period of time. For example, the user device 114 can sample the transmission control protocol (TCP) dump data for one second. As another example, the user device 114 can measure the network connection response time and speed. Yet, as another example, the user device 114 can determine an average time interval at which one or more user devices 114 transmit data on the current network 124.

Characteristics of the current network 124 can further include a connectivity profile of the current network 124. A connectivity profile can include, but not limited to, one or more types of device connectivity within the network 124, such as Wi-Fi, Bluetooth, Wired Ethernet, the Internet Service Provider (ISP), etc.

In general, the requesting user device 114 can transmit to the authentication system 118 one or more of (i) information related to the request, including a time period of the request, (ii) an approximate geolocation of the user, including a list of adjacent networks, and/or (iii) one or more characteristics associated with the current network 124, as described above. Based on the transmitted data, the authentication system 118 can authenticate the identity of the user associated with the requesting user device 114. In some embodiments, an authentication application installed on the requesting user device 114 can be configured to automatically collect the data needed for authentication by interacting with the local network 124 (and various devices connected thereto) and transmit the data to the service provider system 116, which in turn forwards the data to the authentication system 118.

Figure 2:
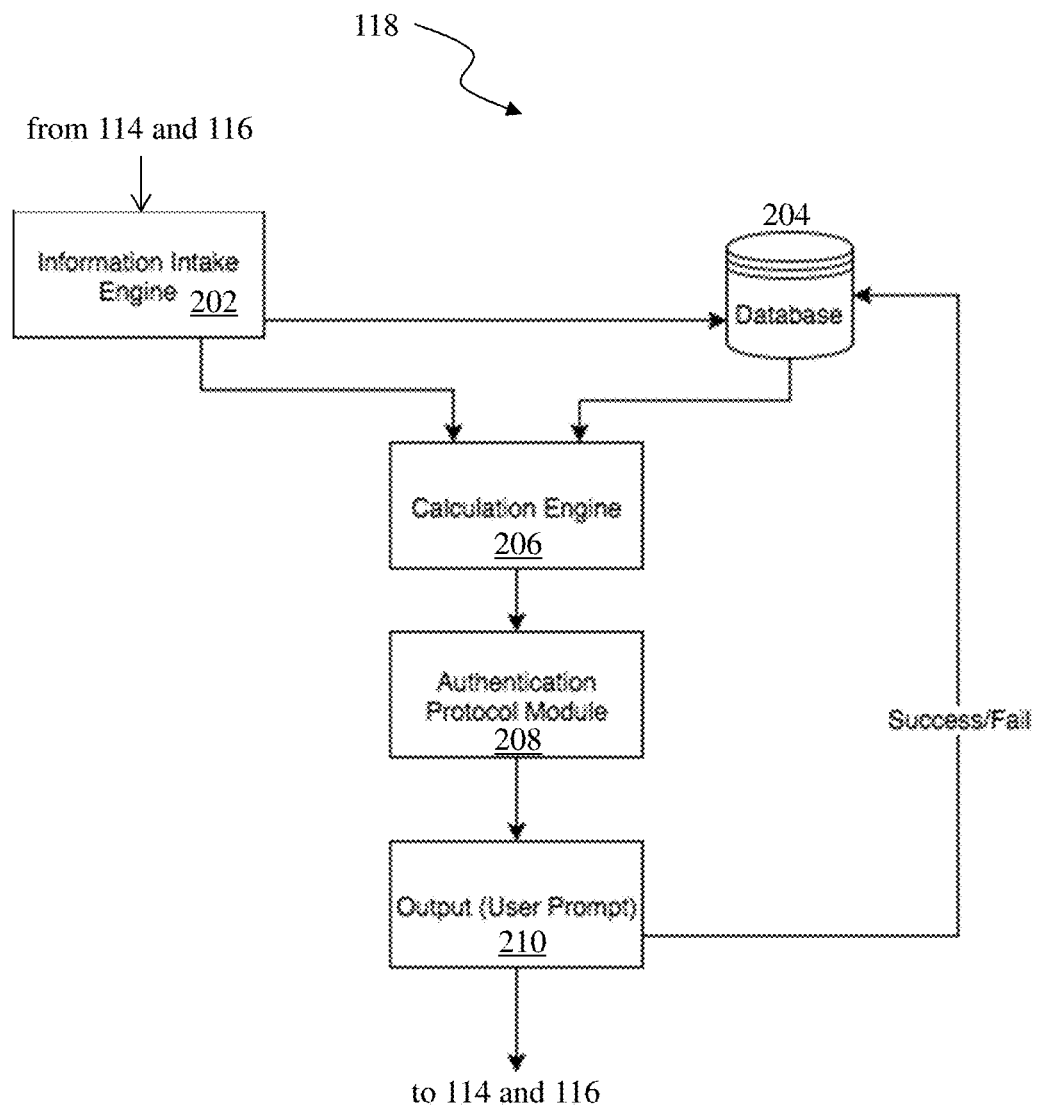
FIG. 2 is a block diagram of an adaptive authentication system within the network environment of FIG. 1, according to an illustrative embodiment of the invention.

FIG. 2 is a block diagram of the adaptive authentication system 118 within the network environment of FIG. 1, according to an illustrative embodiment of the invention. The authentication system 118 is configured to receive at an information intake engine 202 authentication data from the requesting user device 114 via the service provider system 116. The authentication data can include one or more of (i) information related to the access request, including a time period of the request, (ii) information related to the geolocation of the user, including a list of adjacent networks and/or (iii) one or more characteristics associated with the current network 124, as described above.

The information related to the access request can include identification information associated with the user of the requesting user device 114, such as a user name and/or password. Based on the identification information, the authentication system 118 can retrieve from a database 204 a usage profile corresponding to the identity and/or password of the user. Using the retrieve usage profile from the database 204 and the authentication data from the information intake engine 202, a risk score calculation engine 206 can generate a risk score corresponding to the authentication attempt. The authentication system 118 can also include an authentication protocol module 208 that is configured to make a recommendation for adjusting the complexity of the authentication process based on the risk score from the risk score calculation engine 206. The authentication system 118 can further include an output module 210 in electrical communication with the service provider system 116 for conveying the risk score and the authentication adjustment recommendation, based on which the service provider system 116 and/or the authentication system 118 can provide authentication with the appropriate level of complexity. In some embodiments, the output module 210 can forward one or more of (i) the risk score, (ii) the authentication adjustment recommendation or (iii) an outcome of the authentication, e.g., either success or fail, to the database 204 for storage.

A usage profile corresponding to each user can be created and maintained in the database 204 that can be integrated with the authentication system 118 as illustrated or at a location external to the authentication system 118. The usage profiles can be stored and indexed in the database 204 in accordance to their corresponding user identifiers and/or other user identification information. Each usage profile contains data capturing historical user log-in behavior and habits that can be utilized by the authentication system 118 to determine a risk level related to the current authentication attempt.

Each usage profile can store certain data related to at least one successful user authentication attempt at a past point in time. For each successful attempt, the data stored in the usage profile can include an approximate time period during which the attempt was made, such as early morning, morning, noon, or afternoon, etc., along with the day of the week of the successful attempt. In some embodiments, the data can include one or more of (i) historical physical locations from which the user authenticated in the past and/or (ii) identities of a list of networks adjacent to each of the historical physical locations (e.g., within a geographical range of the historical physical locations). By comparing the list of the adjacent networks currently surrounding the requesting user device 114 with the list of historical adjacent networks, the authentication system 118 can determine the degree of match between the two lists, which indicates whether the user is attempting to authenticate from a familiar location. Generally, the greater the number of the current neighboring networks appears in the historical list of adjacent networks, the more likely that the current network is a familiar network. In some cases, if the authentication system 118 determines that the user is logging in from a familiar location (e.g., one with at least one familiar nearby network), the authentication system 118 does not adjust the risk score. As an example, if a user is identified as logging in from a location near a familiar SSID/MAC combination, such as within an acceptable distance from a network with such a combination, the risk score is decreased or remains the same due to the relative proximity to the familiar network.

In some embodiments of a usage profile, the stored data, which is associated with at least one successful user authentication attempt at a past point in time, can include one or more characteristics of at least one historical network from which the user successfully authenticated at the past point in time. One of the characteristics can include the identity (and other identification information) of one or more user devices connected to the corresponding historical network. Similar to the process of determining one or more additional user devices 114 connected to the current network 124, the usage profile can index a list of user devices (e.g., home electronic devices) connected to each historical network at the time of successful authentication. If a predetermined number of network-connected user devices 114 of the current network 124 matches the network-connected user devices in the usage profile, this may indicate to the authentication system 118 that the current network 124 is a familiar network. For example, if the current network 124 has only one network-connected device (e.g., computer) that matches the network-connected devices listed in his usage profile, then the user's risk score can be increased. However, is all the network-connected devices of the current network 124 appear in his usage profile (that is, if all the familiar devices are present in the usage profile), the risk score can be decreased or remain the same. As another example, when a user authenticates from home, the user's usage profile can reveal that 7 other devices are typical connected to his home network, including computers, lights, thermostat, and a few mobile devices. However, if during his current authentication attempt, only one computer is connected to the network, the corresponding risk level may be elevated. Further, this usage profile can be filtered based on the time of authentication. For example, if the user attempts to authenticate around 2:00 AM, the usage profile can reveal that fewer devices are connected to the home network around that time frame. Therefore, if only a mobile device, lights, and a thermostat are connected to the same network at the time of authentication instead of the 7 devices typically connected to the network, the resulting risk score may only be slightly elevated or remains the same.

Another characteristic of a historical network maintained by a usage profile can include the identity (and other identification information) of one or more devices directly connected to each requesting user device involved in the past successful authentications. For example, if a predetermined number of user devices directly connected to the requesting user device of the current authentication attempt match the directly-connected user devices in the usage profile, this may indicate to the authentication system 118 that the current user device is a familiar device. For example, if the requesting user device 114 of the current authentication attempt is directly connected to an iPhone, a wearable fitness device and an Apple watch and all three devices appear in the user's usage profile, then the risk score for the attempted authentication is likely to be lowered or remain the same.

Another characteristic of a historical network maintained by a usage profile can include traffic information, such as a traffic pattern, of a historical network associated with a successful authentication attempt in a past point in time. The traffic pattern of the current network 124 can be compared to historical traffic patterns to determine the relative risk associated with the current authentication attempt. For example, based on a user's usage profile, if a historical network from which the user used to log in typically has a traffic pattern of one device pinging every 5 minutes and another device maintaining an always-on feedback loop, but there is no traffic coming in or out of the network during the current authentication attempt, then the authentication system 118 is likely to deem this current traffic pattern atypical and the resulting risk score may be elevated.

Yet another characteristics of the a historical network maintained by a usage profile can include a connectivity profile of the historical network, which can comprise, but not limited to, one or more types of device connectivity within the historical network.

The authentication system 118, upon receiving the authentication data from a requesting user device 114 via the service provider system 116, is adapted to retrieve a usage profile maintained in the database 204 that corresponds to the user identified by the authentication data. The usage profile can include a host of information as described above, such as historical geolocation data, network device signatures, network traffic patterns, and other historical data associated with the user that can be used to establish a computing habit of the user. In general, the authentication system 118 can analyze the usage profile and compare the authentication data with the usage profile to holistically determine the risk involved in the current authentication request and whether the risk level is sufficiently elevated to trigger additional layer(s) of security (e.g., another factor of authentication).

In some embodiments, the authentication system 118 filters the usage profile to extract more pertinent data for assessing the level of risk involved with the current authentication request. The authentication system 118 can filter data in the usage profile based on the time period of request (e.g., early morning, morning, noon, etc. and/or the day of the week of the request) such that only data in the usage profile that have the same time period is used for the risk determination. For example, if 5 pm to 7 pm corresponds to "early evening" and 7 pm to 11 pm corresponds to "evening", when an authentication request is made at 6 pm, only the historical data within the "early evening" time period of the user's usage profile is used for risk determination. As another example, when an authentication request is made at 6:55 pm or 7:05 pm, a combination of historic data from both "early evening" and "evening" can be used for risk determination since the authentication request time is bordering both time periods. In general, being able to filter and/or classify a user's usage profile based on time can more accurately capture the user's behavior. The filtered and/or classified data can also change over time as more information is collected to better define the user's evolving behavior during specific time periods.

As shown in FIG. 2, the authentication system 118 includes risk score calculation engine 206 used to determine a numerical risk score for an authentication request based on (i) a least a portion of the data in the usage profile of the user retrieved from the database 204 and (ii) the authentication data from the information intake engine 202, including the time period of the authentication request, the approximate geolocation of the requesting user device 114 and the one or more characteristics associated with the current network 124 from which the request originated. The risk score can be a weighted sum of numerical differences between at least a portion of the data in the usage profile and the authentication data received from the requesting user device 114. Equations 1 and 2 below represent an exemplary algorithm used by the risk score calculation engine 206 to compute a risk score (R):

$$R = W_g G + W_d D + W_t T,  \quad \text{Equation 1}$$

Where $$1 = W_g + W_d + W_t  \quad \text{Equation 2}$$

Equation 1 uses three factors G (geolocation), D (device signature) and T (network traffic) to compute the risk score R, where each factor can be assigned a specific weight W. As shown, the geolocation factor G is a value representing the extent of a match between the historical listing and the current listing of adjacent networks. The device signature factor D is a value representing the extent of a match between the identities of devices connected to the historical network and the current network. The network traffic factor T represents a value representing the extent of a match between the traffic patterns of the historical network and the current network.

In some embodiments, the weights for the three factors, $W_g$, $W_d$ and $W_t$ add up to 1. In some embodiments, the time period of the request is included as factors in the calculation of the risk score R (not shown in Equation 1) such that only the historical data with a timestamp that is about the same as that of the current request is used in the calculation of the risk score R. In some embodiments, the risk score calculation includes an additional factor that measure the extent of a match between the connectivity types within the current network 124 and within the historical networks (not shown in Equation), which reflects whether the user is authenticating from a familiar location.

In some embodiments, the weights (e.g., $W_g$, $W_d$ and $W_t$) are determined dynamically by a self-adjusting machine-learning algorithm such that the different types of data form a correlation among each other. For instance, the weights can be evenly distributed when the system is newly activated with no or minimal historic data samples. Over time, a particular factor is self-adjusted to a higher weight value if it is statistically proven to be a more stable factor than another factor. As an example, when a user authenticates in the evening on a weekday, based on the user's usage profile, there is a high probability that the user is authenticating from home and that the network traffic pattern or device connection pattern has statistically minimal variation. Hence, the factors corresponding to time and geolocation are given a higher weight compared to the factors corresponding to traffic pattern and connected devices.

Equations 3-5 provide an exemplary algorithm for calculating the geolocation factor G of Equation 1:

$$G = \frac{1}{n}\sum g_n, \qquad \text{Equation 3}$$

Where $$\Sigma g_n = g_1 + g_2 + g_3 + \ldots + g_{n-1} + g_n, \qquad \text{Equation 4}$$

And $$\forall g \begin{cases} g_i = 1 \text{ if network geolocation does} \\ \qquad \text{match a known location} \\ g_i = 0 \text{ if network geolocation does not} \\ \qquad \text{match a known location} \end{cases} \qquad \text{Equation 5}$$

In Equations 3-5, each of $g_1$ to $g_n$ represents whether a surrounding network adjacent to the requesting user device 114 appears in the historical list of adjacent networks. Specifically, the geolocation factor G can be a weighted sum of 1's or 0's, where a 1 indicates that the corresponding current adjacent network appears in the list of historical adjacent networks and a 0 indicates that the corresponding current adjacent network does not appear in the list of historical adjacent networks. Even though the weights in Equation 3 are equal for all the factors $g_i$, in other embodiments, the weights can be different for different adjacent networks based on their relative importance. In some embodiments, if a time factor is included in the calculation of the risk score R, only those historical adjacent networks with a timestamp in the range of the time period of the current request are used in Equations 3 and 4 to calculate the geolocation factor G. In general, the geolocation factor G measures a likelihood of the user connecting from a familiar geolocation.

Equations 6-8 provide an exemplary algorithm for calculating the device signature factor D of Equation 1:

$$D = d_1 i_1 + d_2 i_2 + d_3 i_3 + \ldots + d_{n-1} i_{n-1} + d_n i_n \qquad \text{Equation 6,}$$

Where $$\Sigma i_n = i_1 + i_2 + \ldots + i_{n-1} + i_n = 1 \qquad \text{Equation 7,}$$

And $$\forall d \begin{cases} d_i = 1 \text{ if the } ith \text{ device is matches a} \\ \qquad \text{known connected device} \\ d_i = 0 \text{ if the } ith \text{ device does not match a} \\ \qquad \text{known connected device} \end{cases} \qquad \text{Equation 8}$$

In Equations 7-8, each of $d_1$ to $d_n$ represents whether a user device connected to the current network 124 of the requesting user device 124 appears in the historical list of connected devices. Specifically, the device signature factor D can be a weighted sum of 1's or 0's, where a 1 indicates that the corresponding connected device of the current network appears in the list of historical connected devices and a 0 indicates that the corresponding connected device of the current network does not appear in the list of historical connected devices. In some embodiments, the weights $i_1$ to $i_n$ can be individualized and user assignable to indicate the relative importance of the corresponding connected devices. For example, for those devices that should always be connected to the same network, such as lights or a security camera, they can be assigned a weight corresponding to a higher importance than those devices that do not always need to be connected. The weights $i_1$ to $i_n$ can add to 1. In some embodiments, if a time factor is included in the calculation of the risk score R, only those historical connected devices having timestamps in the range of the time period of the current request are used in Equations 6-8 to calculate device signature factor D. For example, device connections at 3:00 PM during a Thursday at a home network when most people are at work of school can look different from device connections at 10:00 PM on a Sunday night in the same home network. In general, the device signature factor D measures a likelihood of the user connection from a familiar network.

In some embodiments, the traffic factor T of Equation 1 can be computed by comparing snapshots of network traffic of the current network 124 with one or more of the historical traffic patterns in the user's usage profile. The traffic factor T can reflect a degree of match between the current and historical traffic patterns. In some embodiments, if a time factor is included in the calculation of the risk score R, only those historical traffic patterns having timestamps in the range of the time period of the current request are used in the traffic factor T calculation. In general, the traffic factor T also measures a likelihood of the user connection from a familiar network.

The authentication protocol module 208 is configured to determine a suitable authentication protocol to provide to the user based on the risk score determined by the risk score calculation engine 206. The authentication protocol module 208 can first specify a default protocol, such as a one-factor authentication approach, for authenticating a user. After analyzing the risk score of the authentication attempt, the authentication protocol module 208 can adjust the default protocol accordingly. For example, if the risk score is low, the authentication difficulty can remain the same (i.e., the default authentication is sufficient) or lower the complexity of the current authentication approach. However, if the risk score is high, one or more additional authentication factors can be added to escalate the difficulty/complexity of authentication. The number of additional factors can be determined by comparing the risk score to one or more thresholds corresponding to different factors. In an exemplary multi-factor authentication process, a user is prompted for verification of two or more factors from knowledge, possession, and/or inherence. For example, a user can be prompted first for a username/password combination, which is a knowledge-based factor. The user can then be prompted for verification of a mobile device, which is a possession-based factor. As another example, an application code or SMS code can be delivered to a user's mobile device, which serves as a basis for authentication. Other implementations include using a physical token, such as the U2F token (FIDO), for authentication.

In some embodiments, the authentication system 118 is configured to convey the risk score calculated (from the risk score calculation engine 206), along with the authentication protocol recommendation (from the authentication protocol module 208), to the resource provider system 116 via the output module 210. In some embodiments, the authentication system 118 and/or the service provider system 116 administer the recommended authentication protocol and determine whether the user has successfully authenticated. In some embodiments, the authentication system 118 is configured to update a user's usage profile after a successful user authentication attempt. For example, the authentication system 118 can add/track information related to the successful authentication, such as the authentication data transmitted by the requesting user device 114 when seeking authentication, to the corresponding user's usage profile in the database 204. Thus, data related to each risk score factor described above is tracked, including data related to the adjacent networks, the connectivity profile, the connected devices, the traffic patterns, etc. In some embodiments, for each element in the usage profile that remains the same (e.g., the same adjacent network and/or same connected device) or statistically close (e.g., similar traffic pattern) after a successful authentication attempt, that element is marked with an incremental trust score (e.g., incremented by 1). For each new element or change to an existing element after a successful authentication attempt, the new element or the change is added to the usage profile. For each element that is in the usage profile but does not appear in the data related to the successful authentication attempt, the element's trust score is decremented by 1. When the trust score of an element reaches 0, it can be removed from the usage profile.

In some embodiments, the authentication system 118 asks the user's permission to update the usage profile in the database 204 prior to the updating. For example, the authentication system 118 can prompt the user by asking if he is authenticating from a typical location. Therefore, if the user is traveling, the user may not want to store in his usage profile data related to a location he may not revisit. As another example, the authentication system 118 can contact the user if multiple unsuccessful attempts have been make under his account and the system can automatically elevate the risk score thereafter to increase the difficulty of the authentication process.

Figure 3:
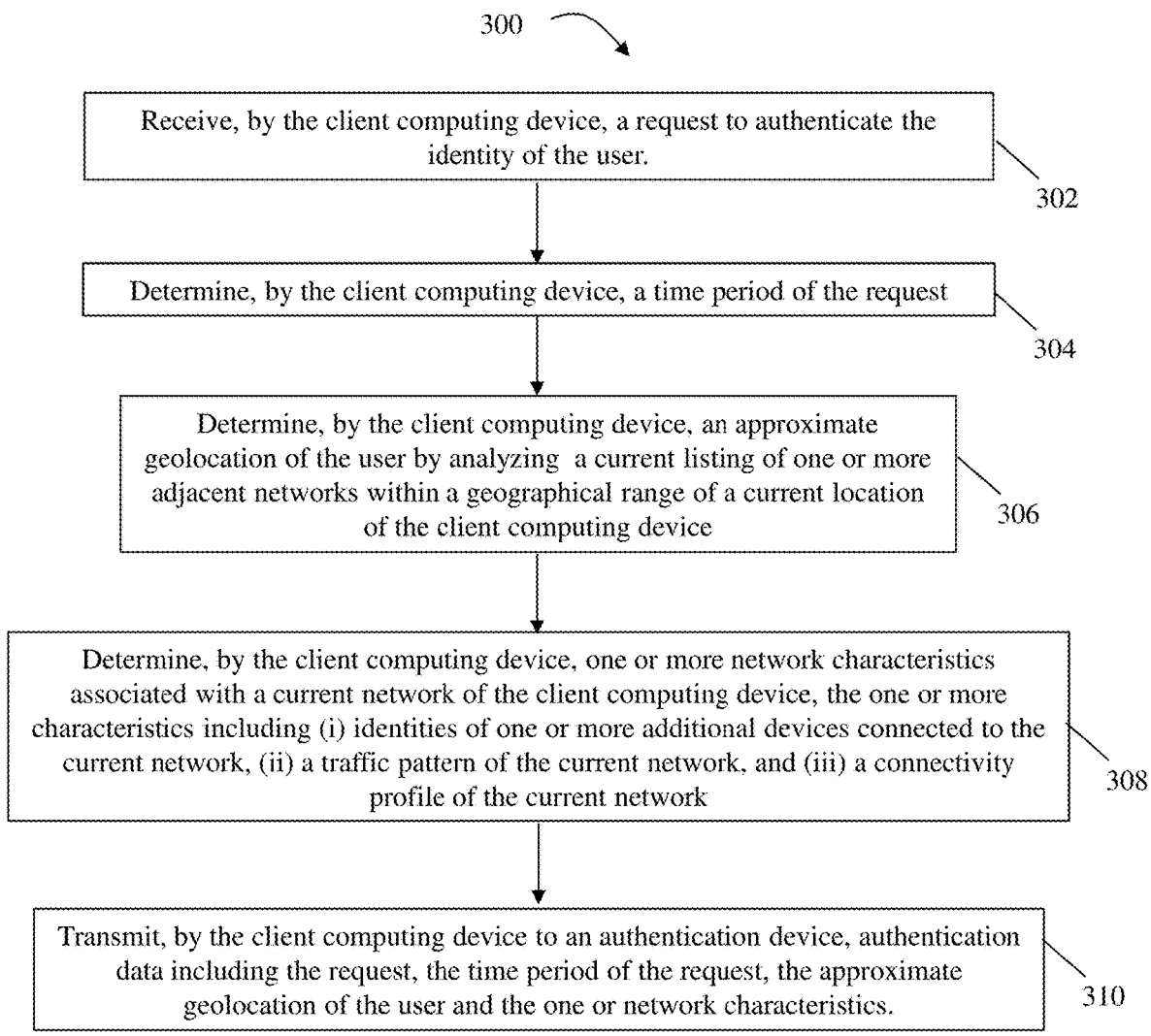
FIG. 3 is an illustrative process for authenticating the identity of a user requesting access to a computerized resource via at least one of the user devices of the computing environment of FIG. 1, according to an illustrative embodiment of the invention.

FIG. 3 is an illustrative process 300 for authenticating the identity of a user requesting access to a computerized resource via one of the user devices 114 of the computing environment of FIG. 1, according to an illustrative embodiment of the invention. The process starts when the user device 114 receives a request from a user to authenticate his identity for the purpose of accessing a computerized resource from the service provider system 116. To complete authentication, the user device 114 can determine a time period of the request (step 304). Additionally, the user device 114 can determine its approximate geolocation by obtaining information regarding its physical location and a list of adjacent networks within a geographical range of the physical location (step 306). The list of adjacent networks may or may not be the local network 124 to which the user device 114 is connected. Further, the user device 114 can determine one or more network characteristics associated with the current local network 124 to which it is connected (step 308). These network characteristics include the identities of one or more additional devices connected to the same network and/or directly connected to the user device 114. These characteristics also include a traffic pattern associated with the current network 124. These characteristics further include a connectivity profile of the current network 124, which can identify the different network connections within the current network 124. The user device 114 is configured to transmit to the collected authentication data to an authentication system 118 in electrical communication with the service provider system 116 via the local network 124 and the IP network 120. The collected authentication data can include data related to the authentication request itself, the time period of the request, and the one or more network characteristics. The authentication system is configured to authenticate the identity of the user based on the authentication data.

Figure 4:
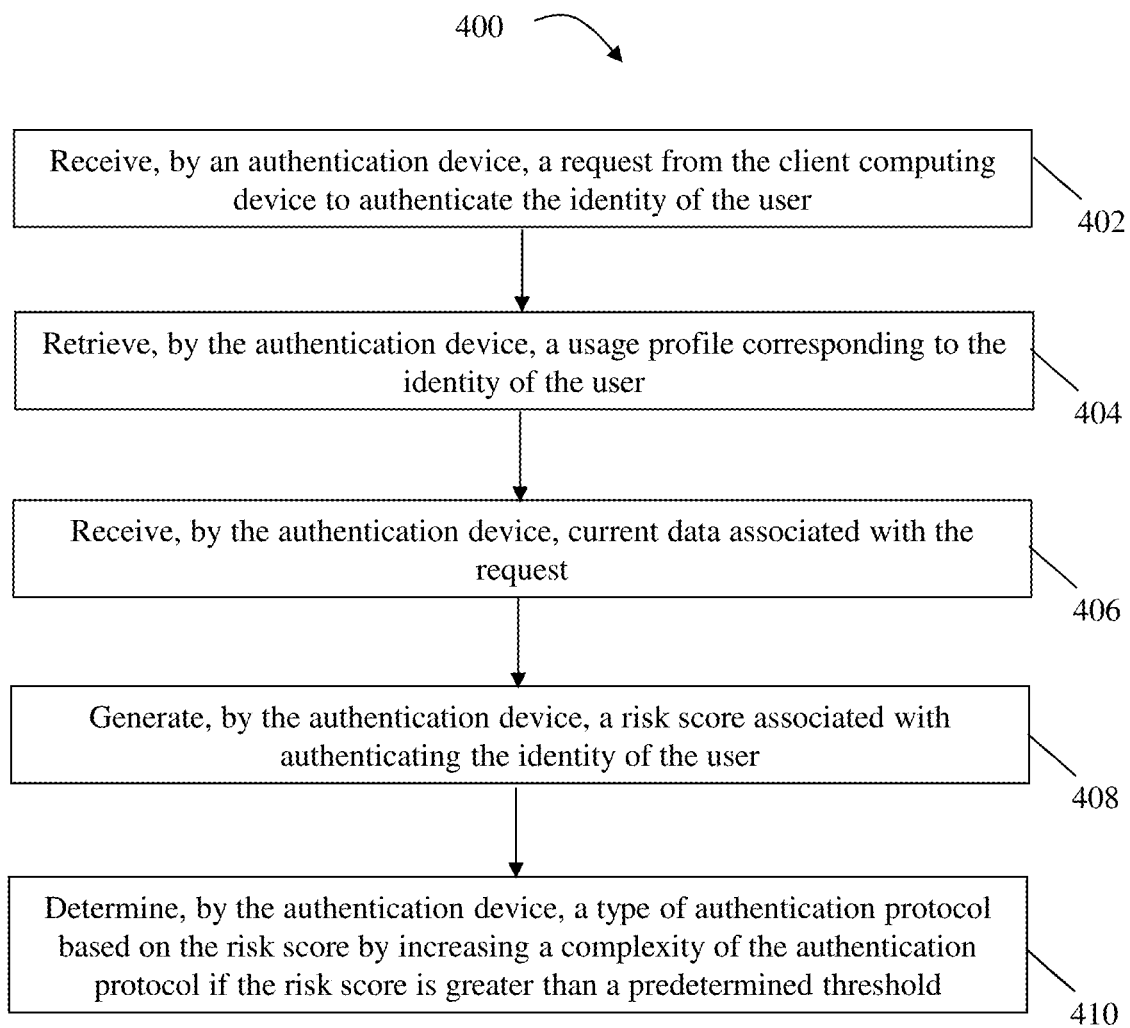
FIG. 4 is an illustrative process for authenticating the identity of a user by the authentication system of the computing environment of FIG. 1, according to an illustrative embodiment of the invention.

FIG. 4 is an illustrative process 400 for authenticating the identity of a user by the authentication system 118 of the computing environment of FIG. 1, according to an illustrative embodiment of the invention. The process 400 starts upon the authentication system 118 receiving a request from a user device 114 to authenticate the identity of a user (step 402). The authentication system 118 also receives from the requesting user device 114 authentication data related to the current request (step 406), such as the data collected and transmitted by the requesting user device 114 described above with respect to the process 300 of FIG. 3. Based on the received request, the authentication system 118 retrieves a usage profile corresponding to the identity of the user from the database 204 (step 404). As described above, the usage profile includes historical data of at least one successful user authentication at a past point in time. The historical data can include (i) a time period of the successful user authentication, (ii) a historical listing of one or more adjacent networks within a geographical range of a location from which the user authenticated at the past point in time, (iii) identities of one or more devices connected to a historical network from which the user authenticated at the past point in time, and (iv) a traffic pattern of the historical network. The risk score calculation engine 206 of the authentication system 118 can generate a risk score associated with authenticating the identity of the user by comparing the current authentication data with at least a portion of the historical data in the usage profile (step 408). For example, the risk score can be a weighted sum of numerical differences between at least a portion of the historical data in the usage profile and the current data. These differences can include (i) a value/factor (G) representing an extent of match between the historical listing of adjacent networks and the current listing of adjacent networks, (ii) a value/factor (D) representing an extent of match between the identities of devices connected to the historical network and the current network, and (iii) a value/factor (T) representing an extent of match between the traffic patterns of the historical network and the current network. The authentication protocol module 208 of the authentication system 118 can proceed to determine a type of authentication protocol to provide to the user based on the risk score. For example, the authentication system can automatically increase a complexity of a default authentication protocol (e.g., adding one or more authentication factors to the default one-factor authentication approach) if the risk score is greater than one or more predetermined thresholds.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for authenticating an identity of a user requesting access to a computerized resource via a client computing device, the method comprising:
   receiving, by the client computing device, a request to authenticate the identity of the user;
   determining, by the client computing device, a time period of the request;
   determining, by the client computing device, an approximate geolocation of the user by analyzing a current listing of one or more adjacent networks within a geographical range of a current location of the client computing device;
   determining, by the client computing device, a plurality of network characteristics associated with a current network of the client computing device, the a plurality of characteristics including (i) identities of one or more additional computing devices connected to the current network, (ii) a traffic pattern of the current network comprising an average time interval at which the one or more additional computing devices transmit data on the current network, and (iii) a connectivity profile of the current network;
   transmitting, by the client computing device to an authentication device, current authentication data including the request, the time period of the request, the approximate geolocation of the user and the plurality of network characteristics; and
   authenticating, by the authentication device, the identity of the user by generating a risk score comprising a weighted sum of numerical differences between at least a portion of historical data in a usage profile corresponding to the identity of the user and the current authentication data, wherein the weighted sum comprises a plurality of weights assigned to a plurality of factors for the authentication, and wherein the weights are determined dynamically from a machine-learning algorithm that is configured to self-adjust the weights over time based on whether the corresponding factors are statistically more stable than other factors; and
   wherein the plurality of factors includes a factor representing a difference between the identities of the one or more additional computing devices connected to the current network and identities of computing devices previously connected to the same network at a time of day that is about the same as that of the request.

2. The computer-implemented method of claim 1, wherein the connectivity profile of the current network describes at least one type of device connectivity within the current network.

3. The computer-implemented method of claim 1, wherein the one or more additional computing devices of the current network comprises at least one of a thermostat, a portable computing device, a desktop computer, a security camera, or a lighting system connected to the same current network as the client computing device.

4. The computer-implemented method of claim 1, wherein the usage profile comprises data of multiple successful authentications at multiple past points in time corresponding to the identity of the user.

5. The computer-implemented method of claim 4, wherein generating the risk score comprises:
   determining, by the authentication device, a filtered portion of the historical data in the usage profile having at least one time period of successful user authentication that matches the time period of the request; and
   calculating, by the authentication device, the risk score based on a weighted sum of values representing differences between the filtered portion of the historical data and the current data.

6. The computer-implemented method of claim 1, wherein authenticating, by the authentication device, the identity of the user further comprises:
   retrieving the usage profile corresponding to the identity of the user, the usage profile comprising the historical data corresponding to at least one successful user authentication at a past point in time, the historical data including (i) a time period of the successful user authentication, (ii) a historical listing of one or more adjacent networks within a geographical range of a location from which the user authenticated at the past point in time, (iii) identities of one or more devices connected to a historical network from which the user authenticated at the past point in time, and (iv) a traffic pattern of the historical network;
   generating the risk score based on the historical data in the usage profile and the current authentication data; and
   determining a type of authentication protocol based on the risk score, wherein the authentication protocol has an increased level of complexity if the risk score is greater than a predetermined threshold.

7. The computer-implemented method of claim 6, wherein retrieving the usage profile comprises retrieving a portion of the historical data in the usage profile corresponding to at least one time period of successful user authentication that matches the time period of the request.

8. The computer-implemented method of claim 1, wherein the numerical differences include (i) a value representing an extent of match between the historical listing and the current listing of adjacent networks, (ii) a value representing an extent of match between the identities of devices connected to the historical network and the current network, and (iii) a value representing an extent of match between the traffic patterns of the historical network and the current network.

9. The computer-implemented method of claim 8, wherein the value representing the extent of match between the historical listing and the current listing of adjacent networks measures a likelihood of the user connecting from a familiar geolocation.

10. The computer-implemented method of claim 8, wherein the values representing the extents of match between the device identities and traffic patterns associated with the historical network and the current network measure a likelihood of the user connecting from a familiar network.

11. A computer-implemented method for authenticating an identity of a user requesting access to a computerized resource via a client computing device, the method comprising:
    receiving, by an authentication device, a request from the client computing device to authenticate the identity of the user;
    retrieving, by the authentication device, a usage profile corresponding to the identity of the user, the usage profile comprising historical data of at least one successful user authentication at a past point in time, the historical data including (i) a historical network listing of one or more adjacent networks within a range of a location from which the user authenticated at the past point in time, (ii) identities of one or more devices connected to a historical network from which the user authenticated at the past point in time, and (iii) a traffic pattern of the historical network;
    receiving, by the authentication device, current data associated with the request, the current data including at least (i) a current network listing of one or more adjacent networks within a range of a current location of the client computing device, (ii) identities of one or more additional computing devices connected to a current network of the client computing device, and (iii) a traffic pattern of the current network comprising an average time interval at which the one or more additional computing devices transmit data on the current network;
    generating, by the authentication device, a risk score associated with authenticating the identity of the user, the risk score comprising a weighted sum of numerical differences between at least a portion of the historical data in the usage profile and the current data, the differences including (i) a value representing an extent of match between the historical network listing and the current network listing, (ii) a value representing an extent of match between the identities of devices connected to the historical network and the current network, and (iii) a value representing an extent of match between the traffic patterns of the historical network and the current network,
    wherein the weighted sum comprises a plurality of weights assigned to a plurality of factors for the authentication, wherein the weights are determined dynamically from a machine-learning algorithm that is configured to self- adjust the weights over time based on whether the corresponding factors are statistically more stable than other factors, and wherein the plurality of factors include a factor representing a difference between the identities of the one or more additional computing devices connected to the current network and the identities of the devices previously connected to the same network at a time of day that is about the same as that of the request; and
    determining, by the authentication device, a type of authentication protocol based on the risk score by increasing a complexity of the authentication protocol if the risk score is greater than a predetermined threshold.

12. The computer-implemented method of claim 11, wherein increasing the complexity of the authentication protocol comprises adding another factor to the authentication protocol if the risk score is above the predetermined threshold.

13. The computer-implemented method of claim 11, further comprising storing, by the authentication device, at least one of the current data or the usage profile corresponding to the identity of the user.

14. The computer-implemented method of claim 11, further comprising:
    determining, by the authentication device, a filtered portion of the historical data in the usage profile having at least one time period of successful user authentication that matches a time period of the request; and
    calculating, by the authentication device, the risk score based on a weighted sum of values representing differences between the filtered portion of the historical data and the current data.

15. The computer-implemented method of claim 11, further comprising updating, by the authentication device, the usage profile with the current data after successful user authentication.

16. The computer-implemented method of claim 15, further comprising asking, by the authentication device, the user's permission to update the usage profile prior to the updating.

17. A computer program product, tangibly embodied in a non-transitory computer readable storage device, for authenticating an identity of a user requesting accessing to a computerized resource via a client computing device, the computer program product including instructions operable to cause the client computing device to:
    receive a request to authenticate the identity of the user;
    determine a time period of the request;
    determine an approximate geolocation of the user by analyzing a current listing of one or more adjacent networks within a geographical range of a current location of the client computing device;
    determine a plurality of network characteristics associated with a current network of the client computing device, the a plurality of characteristics including (i) identities of one or more additional computing devices connected to the current network comprising an average time interval at which the one or more additional computing devices transmit data on the current network, (ii) a traffic pattern of the current network, and (iii) a connectivity profile of the current network;
    transmit to an authentication device the request, authentication data including the time period of the request, the approximate geolocation of the user and the plurality of network characteristics; and
    authenticate, by the authentication device, the identity of the user by generating a risk score comprising a weighted sum of numerical differences between at least a portion of historical data in a usage profile corresponding to the identity of the user and the authentication data, wherein the weighted sum comprises a plurality of weights assigned to a plurality of factors for the authentication, and wherein the weights are determined dynamically from a machine-learning algorithm that is configured to self- adjust the weights over time based on whether the corresponding factors are statistically more stable than other factors; and wherein the plurality of factors includes a factor representing a difference between the identities of one or more additional computing devices connected to the current network and identities of computing devices previously connected to the same network at a time of day that is about the same as that of the request.

18. The computer program product of claim 17, wherein the one or more additional computing devices of the current network comprises at least one of a thermostat, a portable computing device, a desktop computer, a security camera, or a lighting system connected to the same current network as the client computing device.

\* \* \* \* \*